United States Patent [19]
Yamauchi et al.

[11] Patent Number: 5,788,786
[45] Date of Patent: Aug. 4, 1998

[54] PNEUMATIC TIRE HAVING FOAMED RUBBER

[75] Inventors: Koji Yamauchi; Nobuyuki Okamura; Kojiro Yamaguchi; Kazunori Shinohara, all of Tokyo, Japan

[73] Assignee: Bridgestone Corporation, Tokyo, Japan

[21] Appl. No.: 858,917

[22] Filed: May 19, 1997

Related U.S. Application Data

[63] Continuation of Ser. No. 409,047, Mar. 23, 1995.

[30] Foreign Application Priority Data

Mar. 25, 1994 [JP] Japan ................... 6-056359

[51] Int. Cl.[6] .................. B60C 1/00; B60C 11/00
[52] U.S. Cl. ....................... 152/209 R; 524/492
[58] Field of Search ............ 152/209 R, 209 D; 524/492, 493

[56] References Cited

U.S. PATENT DOCUMENTS

| | | | |
|---|---|---|---|
| 3,768,537 | 10/1973 | Hess et al. | 152/209 R |
| 4,249,588 | 2/1981 | Egan | 152/209 R |
| 4,396,052 | 8/1983 | Ahagon et al. | 152/209 R |
| 4,430,466 | 2/1984 | Cooper | 524/83 |
| 4,894,409 | 1/1990 | Shimade et al. | 524/492 |
| 5,089,554 | 2/1992 | Bomo et al. | 524/493 |
| 5,147,477 | 9/1992 | Mouri et al. | 152/209 R |
| 5,176,765 | 1/1993 | Yamaguchi et al. | 152/209 R |
| 5,181,976 | 1/1993 | Iwafune et al. | 152/209 R |
| 5,302,636 | 4/1994 | Takino et al. | 524/11 |
| 5,336,730 | 8/1994 | Sandstrom et al. | 152/209 R |
| 5,351,734 | 10/1994 | Mouri et al. | 152/209 R |

FOREIGN PATENT DOCUMENTS

| | | | |
|---|---|---|---|
| 0 517 538 | 12/1992 | European Pat. Off. | |
| 40 05 493 | 8/1990 | German Dem. Rep. | |
| 62-283001 | 12/1987 | Japan | |
| 64-22940 | 1/1989 | Japan | |
| 56746 | 3/1989 | Japan | 152/209 R |
| A-03 210 342 | 9/1991 | Japan | |
| 3-252431 | 11/1991 | Japan | |
| 3-252433 | 11/1991 | Japan | |
| 80786 | 3/1994 | Japan | 152/209 R |

*Primary Examiner*—Steve D. Maki
*Attorney, Agent, or Firm*—Sughrue, Mion, Zinn, Macpeak & Seas, PLLC

[57] ABSTRACT

A pneumatic tire in which a foamed rubber layer having closed cells is provided at a surface of a tire tread which substantially contacts at least a road surface, wherein the foamed rubber layer has closed cells whose average diameter is about 1 m to about 120 m and has an expansion ratio of about 1% to about 100%, a solid-phase rubber portion of the foamed rubber layer has a rubber composition in which at least both of a diene-type rubber and silica are mixed, and an amount of the silica is about 10 to about 80 parts by weight based on 100 parts by weight of the diene-type rubber. The pneumatic tire exhibits excellent traction and braking abilities and controllability on snowy, icy and wet road surfaces.

15 Claims, 1 Drawing Sheet

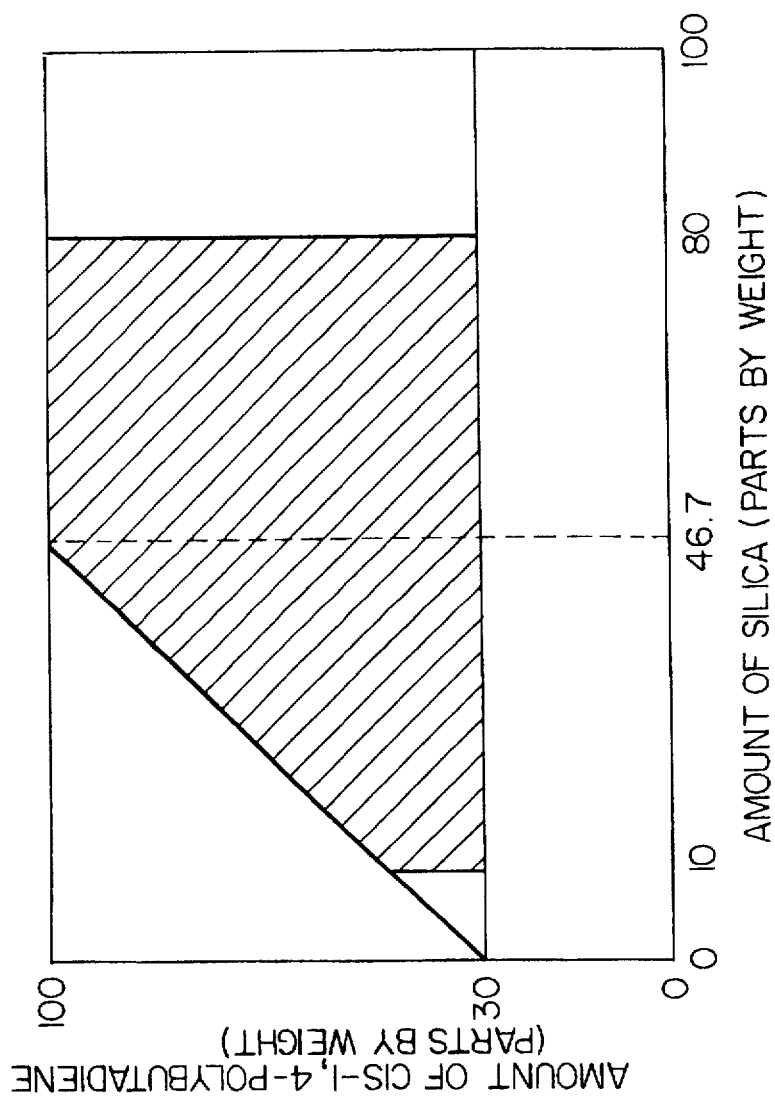

PNEUMATIC TIRE HAVING FOAMED RUBBER

This is a Continuation of application Ser. No. 08/409,047 filed Mar. 23, 1995.

BACKGROUND OF THE INVENTION

1. Field of the Invention

The present invention relates to a pneumatic tire, and more particularly, to a pneumatic tire in which not only heat build-up resistance and wear resistance are good but also controllability, traction and braking abilities on snowy, icy and wet road surfaces are excellent.

2. Description of the Related Art

Due to the regulation of a spiked tire, a studless tire, which satisfies the controllability, traction and braking abilities of tires on snowy or icy road surface (hereinafter, "snow/ice gripping ability"), and the controllability, traction and braking abilities of tires on the wet road surface (hereinafter, "wet skid resistance"), has been strongly desired. Various studies have been made to the tread patterns of the tire, rubber members of the tread or the like.

As an excellent example of improving the snow/ice gripping ability by the rubber members of the tire tread, a so-called foamed tire (U.S. Pat. No. 5,147,477) is well known. Here, a foamed rubber layer is provided at the rubber of the tread and a rubber composition, in which natural rubber/polybutadiene rubber and carbon black are mainly mixed, is used for the rubber layer. This foamed tire has excellent snow/ice gripping ability, and, in order to manufacture the tire, it has solved a difficult technical drawback of controlling both vulcanization reaction and foaming reaction at the time of vulcanization.

In order to prevent hardening of the foamed tire in a low temperature area of snow or iced road surface, it is preferable that the amount of polybutadiene rubber is increased. However, wet skid resistance of the polybutadiene rubber is rather poor. Consequently, as is frequently seen in winter, in a case in which a snowy or icy portion and a wet portion exist on the same road surface, it is necessary to increase the wet skid resistance of the tire by effectively utilizing, for example, the way in which a suitable siping pattern is disposed on the tread of the tire. In view of these points, the inventors have done various studies to achieve higher levels of snow/ice gripping ability and wet skid resistance of the tire by improving the foamed rubber layer itself. Thus, the inventors have achieved the present invention which will be summarized hereinafter.

SUMMARY OF THE INVENTION

An object of the present invention is to provide a pneumatic tire which has excellent snow/ice gripping ability and wet skid resistance while maintaining good heat build-up resistance and wear resistance thereof.

Compounding agents such as polymer, filler, and vulcanization accelerator of a rubber composition in a solid-phase rubber portion of a foamed rubber layer of the tire tread (hereinafter, "rubber composition"), and the formulation of these compounding agents have been researched. After considering controls of foaming reaction and vulcanization reaction, the aforementioned drawbacks are solved as described hereinafter. Namely, an appropriate amount of silica and an appropriate amount of a diene-type rubber of a low glass transition temperature are used as the rubber composition of the foamed rubber layer, and the competitive reaction between the foaming reaction and the vulcanization reaction is controlled by properly using appropriate amounts of carbon black, a silane coupling agent, a vulcanization accelerator, a vulcanizing agent or the like so as to form a foamed rubber layer which has a specified expansion ratio and includes closed cells having a specified average cell diameter. By applying the foamed rubber layer to the tread of the pneumatic tire, the present invention is achieved.

The present invention relates to a pneumatic tire in which a foamed rubber layer having closed cells is provided at a surface of a tire tread which substantially contacts at least a road surface, wherein the foamed rubber layer has closed cells whose average diameter is about 1 µm to about 120 µm and has an expansion ratio of about 1% to about 100%, a solid-phase rubber portion of the foamed rubber layer has a rubber composition in which at least both of a diene-type rubber and silica are mixed, and an amount of the silica is about 10 to about 80 parts by weight based on 100 parts by weight of the diene-type rubber.

BRIEF DESCRIPTION OF THE DRAWING

FIG. 1 shows a relationship between an amount of cis-1, 4-polybutadiene and an amount of silica.

DETAILED DESCRIPTION OF THE INVENTION

A foamed rubber layer is at least about 10% or more by volume of the volume of the entire tread, preferably about 10% to about 70% by volume, and more preferably about 40% to about 60% by volume. When the volume of the foamed rubber layer is less than 10% by volume, an effect of improving the snow/ice gripping ability or the like of the tread deteriorates. In addition, the entire tread may be formed by a foamed rubber layer (100% foamed rubber layer).

The foamed rubber layer is comprised of a solid-phase rubber portion (a non-foamed rubber portion) and cavities (closed cells), i.e., a cell portion, which is formed in the solid-phase rubber portion.

In a case in which a tread outer layer is comprised of a foamed rubber layer, and an inner side of the tread layer in a radial direction of the tire (hereinafter, "tread inner layer") is formed only by the solid-phase rubber portion, the hardness of the solid-phase rubber portion of the tread inner layer is preferably 50 degrees or more specified by JIS (Japanese Industrial Standard), and more preferably 50 degrees to 70 degrees. Further, it is desirable that the hardness of the tread inner layer is greater than that of the foamed rubber of the tread outer layer.

Moreover, the foamed rubber layer may be applied only to a portion of the tread outer layer which contacts the road surface.

The average cell diameter of the closed cells in the foamed rubber is about 1 µm to about 120 µm, preferably about 10 µm to about 120 µm. When the average cell diameter is less than about 1 µm, flexibility of the foamed rubber at a low temperature or effect of removing water film between the tread and the road surface cannot be obtained. Moreover, when the average cell diameter exceeds about 120 µm, the wear resistance and the strain restoring force of the foamed rubber are reduced, and a so-called permanent set resistance in load thereof deteriorates. Further, it is difficult to obtain a stable shape of the tire at the time of manufacturing due to the increase of the permanent set of the foamed rubber.

The expansion ratio (Vs) is represented by the following equation.

$$Vs=\{(\rho_0-\rho_g)/(\rho_1-\sigma_g)-1\}\times 100(\%) \quad (1)$$

wherein, $\rho_1$ is the density (g/cm$^3$) of the foamed rubber;

$\rho_0$ is the density (g/cm$^3$) of a solid-phase rubber portion of the foamed rubber; and $\rho_g$ is the density (g/cm$^3$) of a gas contained in the foams of the foamed rubber.

Because the density $\rho_g$ of the gas contained in the foams is substantially zero, and is negligibly small as compared with the density $\rho_0$ of the solid-phase rubber portion, the above equation (1) is substantially the same as the following equation.

$$Vs=(\rho_0/\rho_1-1)\times 100(\%) \quad (2)$$

The expansion ratio Vs is desirably within a range of about 1% to about 100%, more preferably about 2% to about 50%. When the expansion ratio Vs is less than about 1%, the improvement of the snow/ice gripping ability or the like is not observed. When the expansion ratio Vs exceeds 100%, the wear resistance and the strain restoring force of the foamed rubber are reduced, and a so-called permanent set resistance in load thereof is reduced. In addition, it is difficult to obtain a stable shape when the tire is manufactured.

In the tread which is formed by the tread outer layer, which contacts the road surface, and the tread inner layer, when the foamed rubber layer is used for the tread outer layer, it is desirable that the expansion ratio Vs is within a range of about 2% to about 50%.

The foamed rubber which is used for the tread of the pneumatic tire relating to the present invention is formed by applying heat and pressure to a rubber composition containing a blowing agent, in accordance with an ordinary tire manufacturing method.

The blowing agent includes: azo compound such as azodicarbonamide, azobisisobutyronitrile; nitroso compound such as dinitrosopentamethylenetetramine; sulfonylhydrazide compound such as benzenesulfonylhydrazide, toluenesulfonylhydrazide, the other aromatic sulfonylhydrazide, derivatives thereof, p-p'-oxybis (benzenesulfonylhydrazide) or the like. Above all, dinitrosopentamethylenetetramine is preferable from the point of controlling the cell diameter.

As a rubber component used for the rubber composition of the foamed rubber layer of the tread in the present invention, a diene-type rubber having a glass transition temperature of $-60°$ C. or less is desirable. This is because when the tread is in a low temperature area, sufficient elasticity of rubber is maintained and sufficient snow/ice gripping ability is obtained. The diene-type rubber includes natural rubber, cis-1,4-polyisoprene, cis-1,4-polybutadiene or the like, and is used in a single form or mixed form of two or more types. Among them, cis-1,4-polybutadiene is preferably used since the glass transition temperature is low and the effect of snow/ice gripping ability is great, and in particular, polybutadiene having a cis content of about 90% or more is preferable. About 30 parts by weight or more of cis-1,4-polybutadiene is used in 100 parts by weight of a diene-type rubber, and preferably about 50 parts by weight or more thereof is used. When cis-1,4-polybutadiene is used in an amount of less than 30 parts by weight, the hardness of the rubber increases on the snowy or icy road surface, and the snow/ice gripping ability of the tread becomes insufficient.

As diene-type rubber, a blend of cis-1,4-polybutadiene and natural rubber is preferably used. In this case, the blending ratio is about 30 parts by weight or more of cis-1,4-polybutadiene to about 70 parts by weight or less of natural rubber in 100 parts by weight of a diene-type rubber. A preferable ratio is about 50 parts by weight or more of cis-1,4-polybutadiene to about 50 parts by weight or less of natural rubber. As a diene-type rubber, SBR (styrene butadiene rubber) can be used for blending. The amount of SBR is about 20 parts by weight or less in 100 parts by weight of a diene-type rubber. Since the glass transition temperature of SBR is high, when a large amount of SBR is used, high wet skid resistance is exhibited. However, the rubber is hardened in a low temperature area on the snowy or icy road surface, and therefore, sufficient snow/ice gripping ability cannot be obtained.

Any available silica can be used for the rubber composition of the foamed layer of the tread, and the present invention is not limited to the particular type of silica. However, there are silica by dry process (silicic acid anhydride) and silica by wet process (silicic acid hydrate), and the silica by wet process is preferable. It is preferable that the silica used herein has a nitrogen absorption specific surface area (N$_2$ SA) of about 150 m$^2$ or more per gram. As a preferable example of the silica by wet process, "Nipsil AQ" (trade name) manufactured by Nippon Silica Industrial Co., Ltd. and the like can be suggested. The amount of the silica is about 10 to about 80 parts by weight based on 100 parts by weight of a diene-type rubber. The amount of the silica is preferably about 15 to about 60 parts by weight because desirable performances are further improved by such amounts. When the amount of silica is less than about 10 parts by weight, the wet skid resistance of the compound rubber is not sufficient. When the amount of silica exceeds about 80 parts by weight, the hardness of the rubber increases. Namely, due to the decrease in the elasticity of the rubber and the difficulty of obtaining stable foaming, the snow/ice gripping ability deteriorates. Further, stable foaming can be obtained by controlling the competitive reaction between the foaming reaction and the vulcanization reaction. When deviation occurs in the respective velocities of the foaming reaction and the vulcanization reaction, it is difficult to obtain a desirable average cell diameter and expansion ratio. It has been well known that silica originally tends to reduce the velocity of the vulcanization. Accordingly, it would be ordinarily inconceivable to use silica in a foamed tire. However, by setting the specified amount of silica and by increasing the amount of vulcanization accelerator, which will be described hereinafter, the velocity of the vulcanization is controlled. The object of the present invention was thereby achieved.

When the diene-type rubber having a low glass transition temperature is used, an antinomy relationship arises in which the snow/ice gripping ability improves but the wet skid resistance is insufficient at the same time. Such drawback has been solved by using silica in this way.

As a preferable example of mixing silica and a diene-type rubber, about 10 to about 80 parts by weight of silica are used based on 100 parts by weight of a diene-type rubber, and about 30 to about 100 parts by weight of 1,4-polybutadiene are used in 100 parts by weight of a diene-type rubber. In this case, silica and cis-1,4-polybutadiene are used in amounts which satisfy the following equation.

[(parts by weight of $B$)−30 parts by weight]≦[1.5×(parts by weight of $S$)]

wherein,

B represents cis-1,4-polybutadiene;

S represents silica;

parts by weight of B represents an amount of B in parts by weight in 100 parts by weight of a diene-type rubber; and parts by weight of S represents an amount of S in parts by weight based on 100 parts by weight of a diene-type rubber.

The relationship between the amount of cis-1,4-polybutadiene and the amount of silica is shown in the hatched portion in FIG. 1. The equation and FIG. 1 illustrate that, for example, when 30 parts by weight of B are mixed, the amount of parts by weight of S is 10 to 80, and when 100 parts by weight of B are mixed, the amount of parts by weight of S is 46.7 to 80.

In the rubber composition of the foamed layer of the tread of the present invention, it is preferable to mix about 30 parts by weight or more of cis-1,4-polybutadiene in 100 parts by weight of a diene-type rubber and about 15 to about 60 parts by weight of silica based on 100 parts by weight of a diene-type rubber because the mixture further increases the effects of improving snow/ice gripping ability and wet skid resistance.

Silane coupling agent can be used for the rubber composition of the foamed layer of the tread of the present invention. Examples of the silane coupling agent are as follows:

bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-nitropropyltrimethoxysilane, 3-nitropropyltriethoxysilane, 3-chloropropyltrimethoxysilane, 3-chloropropyltriethoxysilane, 2-chloroethyltrimethoxysilane, 2-chloroethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenxothiazol tetrasulfide, 3-triethoxysilylpropylbenzothiazol tetrasulfide, 3-triethoxysilylpropyl methacrylate monosulfide, 3-trimethoxysilylpropyl methacrylate monosulfide and the like. Among these compounds, bis(3-triethoxysilylpropyl) tetrasulfide, 3-trimethoxysilylpropylbenzothiazol tetrasulfide and the like are preferable.

Other examples of the silane coupling agent include: bis(3-diethoxymethylsilylpropyl) tetrasulfide, 3-mercaptopropyldimethoxymethylsilane, 3-nitropropyldimethoxymethylsilane, 3-chloropropyldimethoxymethylsilane, dimethoxymethylsilylpropyl-N,N-dimethylthiocarbamoyl tetrasulfide, dimethoxymethylsilylpropylbenzothiazol tetrasulfide and the like.

The amount of silane coupling agent is about 3% to about 20% by weight based on silica, and preferably about 5% to about 15% by weight. When the amount of silane coupling agent is less than about 3% by weight, the strength of rubber is low and wear resistance thereof is poor due to the weak coupling effect. When the amount exceeds about 20% by weight, the strength of rubber is not improved and the cost thereof increases. Therefore, both cases are not preferable.

The vulcanization accelerator used in the rubber composition of the foamed layer of the tread of the present invention is used with vulcanizing agent such as sulfur or the like. As described above, the vulcanization accelerator is important in that the reduction of vulcanization velocity due to the mixing of silica is mitigated, the competitive reaction between the vulcanization reaction and the foaming reaction is controlled so as to obtain stable foaming. A generally well-known vulcanization accelerator is used as vulcanization accelerator. Vulcanization accelerator includes: thiazole type such as mercaptobenzothiazol (MBT), dibenzothiazyl disulfide (MBTS), zinc salt of 2-mercaptobenzothiazol (ZnMBT); sulfenamide type such as N-cyclohexyl-2-benzothiazol sulfenamide (CBS), N-t-butyl-2-benzothiazol sulfenamide (BBS), N-oxydiethylene-2-benzothiazol sulfenamide (OBS), N,N-diisopropyl-2benzothiazol sulfenamide (DPBS); guanidine type such as diphenylguanidine (DPG), diorthotolylguanidine (DOTG); aldehyde/ammonia type; aldehyde/amine type; thiourea type; thiuram type; dithiocarbamate type; xanthate type or the like, and these vulcanization accelerators can be used singly or as a mixture of two or more types. It is particularly preferable that at least one of thiazole type and sulfenamide type is used. The overall amount of vulcanization accelerator is about 0.6 to about 6.0 parts by weight based on 100 parts by weight of a diene-type rubber, and preferably about 1.2 to about 3.5 parts by weight. When the amount is less than about 0.6 parts by weight, it is not preferable from the point of velocity of vulcanization. When the amount exceeds about 6.0 parts by weight, it is not preferable from the point of breakage strength.

Sulfur is used as vulcanizing agent and the amount thereof is about 0.5 to about 3.0 parts by weight based on 100 parts by weight of a diene-type rubber. When the amount is less than about 0.5 parts by weight, it is difficult to obtain the requisite modulus of elasticity. When the amount exceeds about 3.0 parts by weight, it is not preferable from the point of heat aging. The overall amount of vulcanization accelerator and the amount of vulcanizing agent are preferably used in amounts which satisfy the following equation.

$$1.2 \leq (\text{parts by weight of overall amount of vulcanization accelerator/parts by weight of amount of vulcanizing agent}) \leq 4.0$$

wherein, parts by weight represents an amount based on 100 parts by weight of a diene-type rubber.

When the ratio is less than 1.2, fine foaming which is suitable for snow/ice gripping ability cannot be generated. When the ratio exceeds 4.0, the strength of rubber is low and wear resistance thereof is poor.

As a filler for the rubber composition of the foamed layer of the tread of the present invention, carbon black is used along with silica. The carbon black, which has a nitrogen absorption specific surface area ($N_2$ SA) of about 105 $m^2$ or more per gram and has a dibutyl phthalate absorption number (DBP) of about 110 ml or more per 100 grams, is preferably used. Specific examples of carbon black include SAF, ISAF-HM, ISAF-LM, ISAF-HS and the like. The amount of carbon black is about 5 to about 50 parts by weight based on 100 parts by weight of a diene-type rubber, and preferably about 5 to about 30 parts by weight. When the amount of carbon black is less than about 5 parts by weight, the strength of rubber is low and the wear resistance thereof is poor. When the amount exceeds about 50 parts by weight, the hardness of the rubber increases and the snow/ice gripping ability is not sufficient. The sum of the amount of carbon black and the amount of silica is preferably about 80 parts by weight or less based on 100 parts by weight of a diene-type rubber, and the weight ratio of the amount of carbon black to the amount of silica is preferably from 1:0.5 to 1:15, more preferably from 1:0.5 to 1:7. When the amount of carbon black is small, the breakage strength of the foamed layer decreases. On the contrary, when the amount thereof is large, the wet skid resistance decreases.

Besides these components, generally-used compounding agent such as antioxidant, zinc oxide, stearic acid, softener or the like can be included in the rubber composition of the foamed layer of the tread of the present invention. As occasion demands, filler such as magnesium carbonate, calcium carbonate, glass fiber, aluminum hydroxide, clay, whisker or the like can be added to the rubber composition.

EXAMPLES

The invention will be understood more readily with reference to the following examples; however, these examples are intended to illustrate the invention and are not to be construed as limiting the scope of the invention.

Properties of the foamed rubber and performances of the tire were tested in accordance with the following method.

Method of Tests

1. Average Cell Diameter and Expansion Ratio Vs

A block-shaped sample was cut out from the foamed rubber layer of the tread of the test tire. The section of the sample was photographed through a light microscope with 100 to 400 multiplication. The diameters of over 200 closed cells were measured and averaged so that the averaged diameter was expressed as an arithmetic average value. After the density $\rho_1$ (g/cm$^3$) of the above-described block-shaped sample and the density $\rho_0$ of the non-foamed rubber (solid-phase rubber) were measured, the expansion ratio Vs was obtained by using the aforementioned equation (2).

2. JIS Hardness

A specified test sample was prepared similarly to the preparation of an ordinary tread rubber. The hardness was measured at 0° C. in accordance with an ordinary JIS hardness (JIS Standard K6301).

3. Snow/Ice Gripping Ability

As an index, snow/ice gripping ability is represented by braking ability on an icy road. Respective four test tires were placed on a 1500 cc passenger vehicle, and braking ability was measured on the icy road at temperature of −2° C. The index number (ICEµ index number) of foamed tires which do not use silica (Comparative Example 1) was expressed as 100. It shows that larger the numerical value, better the braking ability.

4. Wet Skid Resistance

On a wet concrete road surface on which there is water 3 mm deep, rapid braking is started at a speed of 80 Km/h. The distance between the locking of wheels and the halt thereof was measured, and the wet skid resistance of the test tires was evaluated in accordance with the following equation. The index number (WETµ index number) of foamed tires which do not use silica (Comparative Example 1) was expressed as 100. It shows that larger the numerical value, better the breaking ability.

(Stopping distance of control tires / stopping distance of test tires)×100

In all of Examples and Comparative Examples described hereinafter, the foamed tires were prepared by using as a tread the compound rubber, which was obtained in accordance with the formulations shown in Tables 1 and 2. Thereafter, physical properties of the rubber of the foamed layer of the tread and the performances of tires were measured. The results are shown in Tables 1 and 2. Although not illustrated in the Tables 1 and 2, the average diameter of the closed cells in all of the foamed layers was 30 µm to 70 µm.

Examples 1 through 3

In the rubber compositions of Examples 1, 2 and 3, natural rubber and cis-1,4-polybutadiene are used as the diene-type rubber, and the respective amounts of natural rubber/cis-1,4-polybutadiene are 100/0, 70/30, and 40/60 parts by weight. 20 parts by weight of silica, 25 parts by weight of carbon black and silane coupling agent having 10% by weight of silica are used in all three Examples. The amount of vulcanization accelerator is increased in accordance with the amount of silica. The weight ratio of vulcanization accelerator to sulfur is set to a specified value (1.2 in Examples 1 through 3).

Examples 4 through 12

Examples 4 through 12 were carried out in the same manner as that used in Examples 1 through 3 except that the amount of silica in the rubber compositions in Examples 4 through 6, Examples 7 through 9 and Examples 10 through 12 were 40 parts by weight, 60 parts by weight and 80 parts by weight, respectively.

Comparative Examples 1 through 6

Comparative Examples 1 through 6 were carried out in the same manner as that used in Examples 1 through 3 except for the following factors. In Comparative Examples 1 through 3, silica and silane coupling agent are not added, and the amount of vulcanization accelerator and the weight ratio of vulcanization accelerator to sulfur are reduced. In Comparative Examples 4 through 6, the amount of silica is 100 parts by weight.

TABLE 1

| | COMPARATIVE EXAMPLES | | | EXAMPLES | | | | | |
|---|---|---|---|---|---|---|---|---|---|
| | 1 | 2 | 3 | 1 | 2 | 3 | 4 | 5 | 6 |
| AMOUNT (PARTS BY WEIGHT) | | | | | | | | | |
| NATURAL RUBBER 1) | 100 | 70 | 40 | 100 | 70 | 40 | 100 | 70 | 40 |
| POLYBUTADIENE RUBBER 2) | 0 | 30 | 60 | 0 | 30 | 60 | 0 | 30 | 60 |
| CARBON BLACK 3) | 25 | 25 | 25 | 25 | 25 | 25 | 25 | 25 | 25 |
| SILICA 4) | 0 | 0 | 0 | 20 | 20 | 20 | 40 | 40 | 40 |

TABLE 1-continued

|  | COMPARATIVE EXAMPLES | | | EXAMPLES | | | | | |
|---|---|---|---|---|---|---|---|---|---|
|  | 1 | 2 | 3 | 1 | 2 | 3 | 4 | 5 | 6 |
| SILANE COUPLING AGENT 5) | 0 | 0 | 0 | 2.0 | 2.0 | 2.0 | 4.0 | 4.0 | 4.0 |
| AROMATIC OIL | 5.0 | 5.0 | 5.0 | 5.0 | 5.0 | 5.0 | 5.0 | 5.0 | 5.0 |
| STEARIC ACID | 2.0 | 2.0 | 2.0 | 2.0 | 2.0 | 2.0 | 2.0 | 2.0 | 2.0 |
| ANTIOXIDANT (IPPD) 6) | 2.5 | 2.5 | 2.5 | 2.5 | 2.5 | 2.5 | 2.5 | 2.5 | 2.5 |
| ZINC OXIDE | 2.0 | 2.0 | 2.0 | 2.0 | 2.0 | 2.0 | 2.0 | 2.0 | 2.0 |
| VULCANIZATION ACCELERATOR MBTS 7) | 0.2 | 0.2 | 0.2 | 0.6 | 0.6 | 0.6 | 0.6 | 0.6 | 0.6 |
| VULCANIZATION ACCELERATOR CBS 8) | 0.5 | 0.5 | 0.5 | 1.2 | 1.2 | 1.2 | 1.2 | 1.2 | 1.2 |
| SULFUR | 1.5 | 1.5 | 1.5 | 1.5 | 1.5 | 1.5 | 1.5 | 1.5 | 1.5 |
| BLOWING AGENT DNPT 9) | 5.0 | 5.0 | 5.0 | 5.0 | 5.0 | 5.0 | 5.0 | 5.0 | 5.0 |
| PHYSICAL PROPERTIES OF FOAMED RUBBER | | | | | | | | | |
| EXPANSION RATIO (%) | 21.2 | 19.5 | 19.2 | 18.0 | 20.4 | 20.2 | 20.2 | 21.3 | 21.5 |
| JIS HARDNESS (0° C.) | 45 | 41 | 37 | 50 | 46 | 42 | 55 | 51 | 47 |
| PERFORMANCE OF TIRE | | | | | | | | | |
| ICE μ INDEX | 100 | 112 | 120 | 102 | 112 | 123 | 98 | 112 | 118 |
| WET μ INDEX | 100 | 92 | 86 | 106 | 99 | 94 | 115 | 106 | 102 |

1) SMR #1
2) CIS-1,4-POLYBUTADIENE, "UBEPOL BR150L" (TRADE NAME) (MANUFACTURED BY UBE INDUSTRIES, LTD.)
3) SAF
4) "Nipsil AQ" (TRADE NAME) (MANUFACTURED BY NIPPON SILICA INDUSTRIAL CO., LTD.)
5) "S169" (TRADE NAME) (MANUFACTURED BY DEGUSSA)
6) N-ISOPROPYL-N'-PHENYL-p-PHENYLENEDIAMINE
7) DIBENZOTHIAZYL DISULFIDE
8) N-CYCLOHEXYL-2-BENZOTHIAZOL SULFENAMIDE
9) DINITROSOPENTAMETHYLENETETRAMINE

TABLE K2

|  | COMPARATIVE EXAMPLES | | | | | | EXAMPLES | | |
|---|---|---|---|---|---|---|---|---|---|
|  | 7 | 8 | 9 | 10 | 11 | 12 | 4 | 5 | 6 |
| AMOUNT (PARTS BY WEIGHT) | | | | | | | | | |
| NATURAL RUBBER 1) | 100 | 70 | 40 | 100 | 70 | 40 | 100 | 70 | 40 |
| POLYBUTADIENE RUBBER 2) | 0 | 30 | 60 | 0 | 30 | 60 | 0 | 30 | 60 |
| CARBON BLACK 3) | 25 | 25 | 25 | 25 | 25 | 25 | 25 | 25 | 25 |
| SILICA 4) | 60 | 60 | 60 | 80 | 80 | 80 | 100 | 100 | 100 |
| SILANE COUPLING AGENT 5) | 6.0 | 6.0 | 6.0 | 8.0 | 8.0 | 8.0 | 10.0 | 10.0 | 10.0 |
| AROMATIC OIL | 5.0 | 5.0 | 5.0 | 5.0 | 5.0 | 5.0 | 5.0 | 5.0 | 5.0 |
| STEARIC ACID | 2.0 | 2.0 | 2.0 | 2.0 | 2.0 | 2.0 | 2.0 | 2.0 | 2.0 |
| ANTIOXIDANT (IPPD) 6) | 2.5 | 2.5 | 2.5 | 2.5 | 2.5 | 2.5 | 2.5 | 2.5 | 2.5 |
| ZINC OXIDE | 2.0 | 2.0 | 2.0 | 2.0 | 2.0 | 2.0 | 2.0 | 2.0 | 2.0 |
| VULCANIZATION ACCELERATOR MBTS 7) | 0.8 | 0.8 | 0.8 | 1.0 | 1.0 | 1.0 | 1.2 | 1.2 | 1.2 |
| VULACNIZATION ACCELERATOR CBS 8) | 2.0 | 2.0 | 2.0 | 2.5 | 2.5 | 2.5 | 3.0 | 3.0 | 3.0 |
| SULFUR | 1.5 | 1.5 | 1.5 | 1.5 | 1.5 | 1.5 | 1.5 | 1.5 | 1.5 |
| BLOWING AGENT DNPT 9) | 5.0 | 5.0 | 5.0 | 5.0 | 5.0 | 5.0 | 5.0 | 5.0 | 5.0 |
| PHYSICAL PROPERTIES OF FOAMED RUBBER | | | | | | | | | |
| EXPANSION RATIO (5) | 20.6 | 19.9 | 19.5 | 20.1 | 19.3 | 18.7 | 19.6 | 18.8 | 18.2 |
| JIS HARDNESS (0° C.) | 61 | 56 | 50 | 64 | 62 | 58 | 67 | 65 | 62 |

TABLE K2-continued

|  | COMPARATIVE EXAMPLES | | | | | | EXAMPLES | | |
| --- | --- | --- | --- | --- | --- | --- | --- | --- | --- |
|  | 7 | 8 | 9 | 10 | 11 | 12 | 4 | 5 | 6 |
| PERFORMANCE OF TIRE | | | | | | | | | |
| ICE μ INDEX | 95 | 108 | 113 | 85 | 98 | 101 | 80 | 86 | 92 |
| WET μ INDEX | 120 | 112 | 108 | 120 | 112 | 110 | 118 | 112 | 108 |

1) SMR #1
2) CIS-1,4-POLYBUTADIENE, "UBEPOL BR150L" (TRADE NAME) (MANUFACTURED BY UBE INDUSTRIES, LTD.)
3) SAF
4) "Nipsil AQ" (TRADE NAME) (MANUFACTURED BY NIPPON SILICA INDUSTRIAL CO., LTD.)
5) "S169" (TRADE NAME) (MANUFACTURED BY DEGUSSA)
6) N-ISOPROPYL-N'-PHENYL-p-PHENYLENEDIAMINE
7) DIBENZOTHIAZYL DISULFIDE
8) N-CYCLOHEXYL-2-BENZOTHIAZOL SULFENAMIDE
9) DINITROSOPENTAMETHYLENETETRAMINE As shown in the results of Tables 1 and 2, the present invention achieves superior effects in that snow/ice gripping ability and wet skid resistance are improved, balance between the snow/ice gripping ability and the wet skid resistance is good, and the pneumatic tire of the present invention has sufficient hardness even if it is a foamed tire.

The effects of the present invention can be seen more clearly if Examples are compared with Comparative Examples. For example, the effect of adding silica is clearly seen in Examples 1 through 12 if compared with Comparative Examples 1 through 3, and the effect of limiting the amount of silica is clearly seen in Examples 1 through 12 if compared with Comparative Examples 4 through 6.

Moreover by using 30 parts by weight or more of cis-1, 4-polybutadiene as a diene-type rubber and by using 15 to 60 parts by weight of silica, effects of the present invention increase even further.

Although not illustrated in Tables 1 and 2, at a heat build-up resistance test and a wear resistance test, the results of Examples 1 through 12 are better than or equal to those of Comparative Example 1.

Further, in Examples of the present invention in which silica is used in the foamed tire, it became clear that a thin film layer of the non-foamed rubber, which covers the surface of the tread when the tire is new, can be made thinner. In the conventional foamed tire, since the aforementioned thin film layer covers the surface of the tread with a thickness of about 0.1 mm, the foamed rubber layer is exposed after the vehicle slightly ran in. However, in the Examples of the present invention, since the aforementioned thin film layer can be made thinner, the snow/ice gripping ability of the foamed rubber layer becomes effective from an earlier period of time.

The tread of the respective tested tires (because each of these tires has a pattern having a plurality of blocks, a central portion of the block piece is used.) was cut out in a radial direction of the tire. The tread piece was observed through a light microscope with 100 multiplication and then the distance to the foam from the tread surface was averaged. Here, the distance in Comparative Example 2 was 0.098 mm, the distance in Example 2 was 0.054 mm, and the distance in Example 5 was 0.042 mm. Therefore, the snow/ice gripping ability in the Examples becomes effective from an earlier period of time.

What is claimed is:

1. A pneumatic tire comprising a tire tread which substantially contacts at least a road surface wherein a foamed rubber layer is provided at a surface of the tire tread, and wherein said foamed rubber layer has closed cells whose average diameter is about 1 μm to about 120 μm and has an expansion ratio of about 1% to about 100%, and a solid-phase rubber portion having a rubber composition comprising a mixture of at least both of a diene based rubber and silica, and a vulcanization accelerator which includes at least both a thiazol-based accelerator and a sulfenamide-based accelerator, with said silica present in an amount of from about 10 to about 80 parts by weight based on 100 parts by weight of said diene-based rubber.

2. A pneumatic tire according to claim 1, wherein said foamed rubber layer is about 10% to about 70% by volume of the volume of the entire tread.

3. A pneumatic tire according to claim 1, wherein said foamed rubber layer has closed cells whose average diameter is about 10 μm to about 120 μm.

4. A pneumatic tire according to claim 1, wherein said foamed rubber layer has an expansion ratio of about 2% to about 50%.

5. A pneumatic tire according to claim 1, wherein said diene-based rubber includes about 30 parts by weight or more of cis-1,4-polybutadiene in 100 parts by weight of said diene-type rubber.

6. A pneumatic tire according to claim 5, wherein said silica and cis-1,4-polybutadiene in the foamed rubber layer present are in amounts which satisfy the following equation:

$$[(\text{parts by weight of } B) - 30 \text{ parts by weight}] \leq [1.5 \times (\text{parts by weight of } S)]$$

wherein,

B represents cis-1,4-polybutadiene;

S represents silica;

parts by weight of B represents an amount of B in parts by weight in 100 parts by weight of said diene-based rubber; and parts by weight of S represents an amount of S in parts by weight based on 100 parts by weight of said diene-type rubber.

7. A pneumatic tire according to claim 1, wherein said diene-based rubber comprises about 30 parts by weight or more of cis-1,4-polybutadiene and about 70 parts by weight or less of natural rubber in 100 parts by weight of said diene-based rubber.

8. A pneumatic tire according to claim 1, wherein the amount of said silica is about 15 to about 60 parts by weight based on 100 parts by weight of said diene-based rubber.

9. A pneumatic tire according to claim 1, wherein said diene-based rubber includes about 30 parts by weight or more of cis-1,4-polybutadiene in 100 parts by weight of said diene-based rubber, and the amount of said silica is about 15 to about 60 parts by weight based on 100 parts by weight of said diene-based rubber.

10. A pneumatic tire according to claim 1, wherein said rubber composition includes a silane coupling agent, and the amount of said silane coupling agent is about 3% to about 20% by weight based on said silica.

11. A pneumatic tire according to claim 1, said rubber composition further comprising a vulcanizing agent, which includes sulfur, and with said vulcanization accelerator present in an amount of from about 0.6 to about 6.0 parts by weight of said diene-based rubber, and said vulcanizing agent present in an amount of from about 0.5 to about 3.0 parts by weight based on 100 parts by weight of said diene-based rubber.

12. A pneumatic tire according to claim 1, wherein said vulcanization accelerator and said vulcanizing agent are present in amounts which satisfy the following equation:

$$1.2 \leq (\text{parts by weight of overall amount of vulcanization accelerator/parts by weight of amount of vulcanizing agent}) \leq 4.0$$

wherein, parts by weight represents an amount based on 100 parts by weight of said diene-based rubber.

13. A pneumatic tire according to claim 1, wherein said rubber composition also includes carbon black.

14. A pneumatic tire according to claim 13, wherein said rubber composition includes about 5 to about 50 parts by weight of said carbon black based on 100 parts by weight of said diene-based rubber, said carbon black having a nitrogen absorption specific surface area ($N_2$ SA) of about 105 $m^2$ or more per gram and having a dibutyl phthalate absorption number (DBP) of about 110 ml or more per 100 grams.

15. A pneumatic tire according to claim 13, wherein a sum of an amount of said carbon black and an amount of said silica included in said rubber composition is about 80 parts weight or less based on 100 parts by weight of said diene-based rubber, and a weight ratio of the amount of said carbon black to the amount of said silica is from 1:0.5 to 1:15.

* * * * *